United States Patent [19]

Hucke

[11] 3,859,421
[45] Jan. 7, 1975

[54] METHODS OF PRODUCING CARBONACEOUS BODIES AND THE PRODUCTS THEREOF

[76] Inventor: Edward E. Hucke, 2105 Melrose St., Ann Arbor, Mich. 48104

[22] Filed: May 30, 1972

[21] Appl. No.: 257,907

Related U.S. Application Data

[63] Continuation-in-part of Ser. No. 888,188, Dec. 5, 1969, abandoned.

[52] U.S. Cl. ............... 423/445, 264/29, 264/44, 423/449
[51] Int. Cl. ............... C01b 31/02, C01b 31/36
[58] Field of Search .......... 264/29, 42, 44; 423/445, 423/448, 449

[56] References Cited
UNITED STATES PATENTS

| | | | |
|---|---|---|---|
| 2,431,326 | 11/1947 | Heyroth | 264/44 |
| 3,084,394 | 4/1963 | Bickerdike et al. | 264/29 |
| 3,198,714 | 8/1965 | Johnson et al. | 264/29 |
| 3,302,999 | 2/1967 | Mitchell | 264/29 |
| 3,345,440 | 10/1967 | Googin et al. | 264/29 |
| 3,387,940 | 6/1968 | McHenry et al. | 264/29 |
| 3,419,645 | 12/1968 | Pietzka et al. | 264/29 |
| 3,531,248 | 9/1970 | Sheinberg | 264/29 |
| 3,565,980 | 2/1971 | Otani | 264/29 |
| 3,574,548 | 4/1971 | Sands et al. | 264/29 |
| 3,615,209 | 10/1971 | Whittaker et al. | 264/29 |
| 3,632,385 | 1/1972 | Schmitt et al. | 264/29 |
| 3,635,676 | 1/1972 | Sands | 264/29 |
| 3,663,171 | 5/1972 | Granger | 423/449 |

*Primary Examiner*—Jeffery R. Thurlow
*Attorney, Agent, or Firm*—Strauch, Nolan, Neale, Nies & Kurz

[57] ABSTRACT

The production of cohesive bodies with controlled porosity by blending a carbon yielding binder, a pore forming liquid, and a dispersant; casting the mixture thus formed into a desired configuration; consolidating the cast material to form a self-supporting, physically handleable body; and heating the body to form a cohesive carbonaceous mass.

67 Claims, No Drawings

METHODS OF PRODUCING CARBONACEOUS BODIES AND THE PRODUCTS THEREOF

This application is a continuation-in-part of application no. 888,188 filed Dec. 5, 1969. (now abandoned).

The present invention relates to novel porous carbonaceous bodies and to novel methods for producing such bodies.

One important object of the invention resides in the provision of novel processes for making cohesive carbonaceous bodies of substantial cross-section having a uniformly distributed and controlled number of at least primarily interconnected pores of specified size.

Another important and related object of the invention is the provision of methods for making cohesive, porous carbonaceous bodies in which the solid components of the body are of selected size and selected distribution.

A further important and primary object of the invention resides in the provision of cohesive, porous, carbonaceous bodies having the unique properties identified in the preceding objects.

Bodies of the character described above have many applications. For example, they are useful as filters, electrodes, chemical absorbers, molecular sieves, membranes, catalysts and catalyst supports, chemical hardware, mechanical seals, bearings, electrical devices, dental and surgical prosthetic devices and other implants, thermal insulators, and lightweight structural elements; and they are particularly useful at very high temperatures.

Another particularly important application of the present invention is in the process for making carbide containing articles set forth in my previously issued U.S. Pat. Nos. 3,235,346 and 3,348,967. In this method a porous body of carbonaceous material is infiltered with a molten metallic material containing one or more carbide formers. The carbide formers are subsequently reacted with carbon in the porous body to produce a single or multiple phase, carbide containing article.

In addition, the novel carbonaceous bodies of the present invention can be infiltered with other liquid and gaseous materials or otherwise modified to make them useful for still other applications and to increase their utility in the applications discussed above. Other infiltrants which have been used to advantage include inorganic compounds such as halogens, borates, and oxides and polymers and other organic compounds.

Yet another but more specific object of my invention resides in the provision of novel carbonaceous bodies for the foregoing and other applications and in the provision of novel processes for making such bodies.

For the above-discussed and other applications to which my novel carbonaceous bodies are intended to be put, a carbonaceous body should have most or, in many cases, all of the following properties.

1. a controllable, reproducible, spatially uniform, and selectable apparent density;
2. a controllable, reproducible, spatially uniform, and selectable real density;
3. maximum pore interconnectivity;
4. a controllable, reproducible pore size;
5. minimal pore size variation;
6. a controllable, reproducible, spatially uniform and selectable distribution of the solids comprising the body;
7. a controllable and selectable size of the solid components of the body and minimal variations in this size;
8. selectable reactivity with liquid metals and other infiltrants;
9. minimum residual gas content;
10. high strength at low and/or high temperatures;
11. maximum thermal shock resistance;
12. shapability to precise tolerances in both thin and thick sections;
13. controllable shrinkage;
14. selectable catalytic activity;
15. inertness toward human and other animal tissue;
16. selectable elastic modulus, anelastic properties, and hardness;
17. selectable wettability by various fluids;
18. selectable permeability;
19. selectable electrical, acoustical, optical and thermal properties;
20. low cost.

Still another important but specific object of the invention resides in the provision of novel carbonaceous bodies having the foregoing properties and various combinations thereof and in the provision of novel processes for preparing such bodies.

All of the above-listed properties can be readily provided in the novel carbonaceous bodies I have invented. This and the increased extent to which the desirable attributes are possessed distinguish my novel carbonaceous bodies from those produced by heretofore available techniques.

More specifically, most of the previous technology for making carbonaceous bodies has been directed toward producing high graphitic structures of maximum density with minimum porosity by pressing, impregnation, and casting techniques. U.S. Pat. Nos. 3,084,394 to Bickerdike; 3,310,611 to Zocher; and 3,634,569 to Emanuelson are representative. All three patents describe methods of making carbonaceous bodies in which carbonaceous particles are blended with various solid and/or liquid binders and thermomechanically compacted and heated.

There are also a number of patents dealing with the production of dense carbonaceous bodies by impregnation. Densification and the filling of pores by impregnation with liquid resins followed by carbonization is described in U.S. Pat. No. 3,628,984 to Ishikawa. Gas phase deposition of carbon to close interconnected pores is suggested in U.S. Pat. No. 3,084,394 to Bickerdike.

U.S. Pat. No. 3,198,714 to Johnson discloses a method for producing thin section bodies of minimal porosity by casting to shape and then heating a mixture of carbonaceous particles and a carbonaceous binder. Other references disclose similar methods of producing dense carbonaceous bodies which include a casting step.

The dense carbonaceous bodies produced by the foregoing techniques lack many, if not most, of the desirable attributes of may novel carbonaceous bodies.

Furthermore, in all cases where pressing is used, it is difficult if not impossible to obtain a controlled apparent density which is spatially uniform. Die wall friction creates a special problem in this respect, especially when complicated shapes are involved.

Also, pressed bodies usually contain a sizeable proportion of non-interconnected pores. Furthermore, independent control of pore size and size distribution for a selected apparent density is generally impossible to achieve.

Others have attempted to make carbonaceous bodies which have more porosity than can be obtained by using the foregoing techniques. Only a few methods have heretofore been directed toward making such articles.

The simplest heretofore proposed method of producing a porous carbonaceous structure is by pyrolysis of selected organic structures. Woods, coconut shells, and other natural products, and synthetic organics have been so treated.

Cohesive bodies of significant cross section can generally not be obtained due to the extensive destruction of the structure by the evolution of gas in the pyrolysis step. Furthermore, even if a cohesive structure remains after pyrolysis, it will typically not have pores of uniform size, but will contain both macro and micro sized pores. Also, in the case of natural products, uniform, strong, bodies of controlled porosity cannot be achieved due to non-uniformities in the starting materials.

In the case of synthetic organics it is possible to prevent gross destruction of the body only if its cross section is very thin. Accordingly, many potentially useful shapes cannot be obtained by the pyrolysis of synthetic organic materials.

Also, the opportunities for controlling the amount and size of the pores formed in the body are limited. This further makes bodies produced by the pyrolysis of synthetic materials of limited utility.

Another heretofore proposed technique for producing porous carbonaceous bodies is by the carbonization of a foamed, carbon containing material. In these processes, the foam is produced by using a gaseous pore former, which creates pores of macro size. One exemplary method of this character, disclosed in U.S. Pat. No. 3,657,166 to Caldwell, employs gaseous decomposition products of certain salts of polybasic organic acids as the pore former.

The plastic foam produced in the Caldwell process is partially carbonized to produce elemental carbon as a coloring agent. However, only a small amount of carbon is produced; the bulk of the final article consists of the thermoplastic starting material.

This article would not be suitable for the purposes for which the products I have invented are intended. For example, the Caldwell articles would melt if employed in high temperature service or if infiltered with a molten metal as in the process described in my above-identified, issued patents.

In the process described in his U.S. Pat. No. 3,302,299, Mitchell produces a rigid polymer foam with a haloalkyl blowing agent and then partially oxidizes and carbonizes or graphitizes the foam. U.S. Pat. No. 3,387,940 to McHenry discloses a process which differs from Mitchell's only by the incorporation of filler carbon in the foam. U.S. Pat. No. 3,342,555 to McMillan discloses the foaming of thermosetting resins with conventional blowing agents followed by direct carbonization.

The process described in U.S. Pat. No. 3,345,440 to Googin involves foaming a partially polymerized furfural alcohol with urethane forming compounds to which substantial quantities of powdered fillers such as carbon, metals, and metal oxides have been added. Subsequent carbonization or graphitization of the filled foam is said to yield a porous carbonaceous body.

U.S. Pat. Nos. 3,574,548 and 3,635,676 to Sands disclose a similar method in which foamed carbonaceous bodies are produced from furfural alcohol resins and urethane foaming agents. The later Sands patent highlights one of the major drawbacks of the method of producing porous carbonaceous bodies from foams: viz., a high and uncontrollable rate of shrinkage. Sands' second patent suggests that this can be controlled by incorporating controlled shrinkage fillers into the original foam mixture.

In the methods of producing a porous structure using a gaseous pore former the structure may not have a high percentage of interconnected pores. Furthermore, it is difficult to obtain a high degree of uniformity in pore size and to obtain a pore size smaller than about 200 microns.

Another method of producing porous carbonaceous bodies involves blending a filler carbon with an organic binder, pressing with limited pressure to effect partial compaction, and pyrolyzing the organic binder. One method of this character is disclosed in U.S. Pat. No. 3,171,720 to Shea. A variant in which a syntatic carbon foam is made by pressing blends of hollow, carbon yielding microspheres with organic binders is described in Carbon, Vol. 10, No. 2, 1972, p. 185.

One disadvantage of the just described pressing method is the lack of interconnected pores in the body. This disadvantage is also appurtenant to the method disclosed in U.S. Pat. No. 3,567,808 to Smith in which a closed pore material is produced by pressing a porous filler with organic binders. Porous bodies also result from pressing carbon particles coated with liquid, carbon producing resins as suggested in U.S. Pat. No. 3,608,170 to Larson.

Yet another variation of the pressing technique for preparing porous carbons, disclosed in U.S. Pat. No. 3,647,551 to Reed, involves the use of solid pore forming materials mixed with powdered polyvinylidene choride. The mixture is pressed to shape, and the pressing is followed by removal of the pore former by melting or vaporization during carbonization or by melting, varporization or solution after carbonization.

Certain disadvantages of the pressing method of producing porous bodies were discussed above. This method also additionally has the same previously described disadvantages as when it is used to produce high density bodies.

A variation of the pressing technique is disclosed in U.S. Pat. No. 3,663,171 to Granger. In the Granger method, the sintering of loosely packed particles of thermoplastic pitch is followed by oxidation to yield a non-melting char which can be carbonized to a porous body. Most of the disadvantages of the pressing technique are also present in the Granger process.

Impregnation also can be used to produce porous carbonaceous bodies according to U.S. Pat. No. 3,446,593 to Moutaud. In the method disclosed in this patent, a liquid resin is impregnated into a polymer foam. This is followed by hardening of the resin, decomposition of the foam, and carbonization of the resin. This results in a porous shape similar in structure to the original foam material. The Moutaud process is, however, limited to the production of bodies with low densities and large pore sizes. It also requires expensive starting materials.

Like pressing and impregnation, casting can be used to produce porous as well as dense bodies. The method disclosed in U.S. Pat. No. 3,565,980 to Otani is representative of those which employ a casting step in the manufacture of porous carbonaceous structures.

In his process Otani slip casts a slurry of pitch particles into a porous mold. The cast structure is dried, partially oxidized, and carbonized.

It is impossible to produce bodies with thick sections by this method because the liquid suspending medium must be extracted from the slip or slurry through the mold. The first liquid to be drawn from the slip is in the regions adjacent the mold. As this liquid is withdrawn, the particles in these regions move closer together, increasing the resistance to fluid flow — a phenomenon which is exaggerated in the Otani process by the small size of the pitch particles.

Furthermore, as the withdrawal of liquid continues, the resistance to flow increases dramatically as the length of the path through the regions from which the liquid has previously been withdrawn becomes longer. As a consequence, after the suspending medium has been withdrawn from a region which is only a small fraction of an inch thick, the resistance to further withdrawal of the suspending liquid becomes complete for all practical purposes.

Furthermore, due to the resistance to flow of the fluid through the porous solid the consolidation time is very long, even for relatively thin sections. Also, large amounts of shrinkage occur in the Otani process because the initially separated solid particles move together as the fluid is removed. A large volume change thus necessarily occurs during the consolidation of the solids.

In addition, in the Otani process, the castings have poor green strength after drying because only weak surface forces hold the particles together. Also, it is impossible to independently control pore size, particle size, and apparent density.

Yet another "prior art" method of forming carbonaceous bodies which employes a casting step is disclosed in U.S. Pat. No. 2,431,326 to Heyroth. In the Heyroth process furfural and furfural-furfural alcohol mixtures are treated with concentrated mineral acids. This precipitates carbonaceous particles which gradually knit together, forming a consolidated mass. This mass can be dried and subsequently carbonized to yield a porous body.

Heyroth's process also has a number of disadvantages. Most carbon producing materials, including many which are desirable because of high carbon yields, cannot be utilized because the material will not knit together when treated but will simply precipitate out and form a sludge.

Also, pore size cannot be controlled in the Heyroth process. Further, there is no provision in his method for selecting and controlling the size of the solid components in the carbonaceous body or for maintaining these components in spatial uniformity. In fact, if the carbon producers disclosed by Heyroth are made to set slowly by using a dilute acid rather than a concentrated acid of equivalent volume, an extremely severe separation of the carbon containing material occurs; and a cohesive body cannot be obtained at all.

Moreover, the bodies made by the Heyroth method are extremely fine pored, absorb large quantities of gas, and are too reactive for infiltration with liquid metals and for other applications where lower chemical reactivity is a requisite.

In addition, the Heyroth structures are relatively weak both before and after drying, even with the addition of glycerine to the original mix as suggested by the patentee. Also, the ability of his structures to withstand high temperature thermal shock is not satisfactory.

The casting of the Heyroth mixtures presents a problem as they contain very concentrated mineral acids, and these corrode most common mold materials. Alternatives such as glass are not easily made or maintained as a mold material and will not tolerate the handling which may be necessary to remove the consolidated piece from the mold.

In the consolidation of the carbon precipitated from the original mix into a cohesive body, the Heyroth method has serious disadvantages. The mixtures containing no furfural alcohol take too long to consolidate to a strength adequate for removal from the mold without damage. These mixtures would not be suitable for a commercial operation as minimal time in the mold is required to avoid an inordinately large number of molds.

If the consolidation reactions are speeded by adding furfural alcohol as suggested by Heyroth, they can become almost explosively violent when carried out in large sections since heat is given off by the consolidation reaction and cannot be conducted away due to the poor conductivity of the partially consolidated mass. And, even in less aggravated cases, the volume of the consolidated piece may increase, causing the piece to become larger than when originally cast, due to the creation of bubbles by the reaction heat. In addition, the reaction heat may create severe enough thermal stresses between the center and exterior of the piece to crack the piece or cause cracking in subsequent carbonization.

The significance of these disadvantages becomes more evident when it is realized that they cannot be eliminated merely by adjusting the acid concentration. If the acid concentration is drastically lowered to slow the reaction at a given furfural alcohol content, separation and settling out of the solids will occur before consolidation.

Also, if heat is applied to speed the consolidation process, fluid is evaporated before consolidation is completed; acid vapors are generated; and, usually, cracks will occur at the surfaces where vaporization takes place because surface tension forces contract the surface while the interior remains liquid filled and, therefore, incompressible. Similar cracks may occur on drying.

That acidic vapors are ultimately driven off in the drying or carbonization steps is also a severe drawback of the Heyroth method.

I have now discovered a novel process which is free of the above-discussed and other disadvantages of prior art methods of making carbonaceous bodies. My novel method is at the same time capable of producing carbonaceous bodies with all of the desirable attributes identified above.

Generally speaking, may novel process involves blending a carbon yielding binder with a liquid pore former-dispersant system to form a free-floiwng fluid mixture which includes a selected, spatially uniform distribution of ingredients and a continuous liquid phase. This mixture is cast into a void-free mass of selected shape, which is consolidated into a self-supporting body without the elimination of any material.

The substances present in the spaces occupied by the continuous liquid phase are then eliminated from the body, leaving a system of interconnected pores of selected size and spatial distribution; and the body is concurrently of subsequently pyrolyzed to convert it to a porous cohesive article of carbonaceous character.

As indicated previously, one of the important features of the process just described is that the pore volume and the size of pores in the carbonaceous body can be independently controlled.

This unique aspect of the invention is illustrated by the following table:

TABLE I

| Example, Table II | He-$\rho$ real[1] (g/cc) | Hg-$\rho$ real[2] (g/cc) | $\rho$ app[3] (g/cc) | MPD[4] (microns) | IPV[5] (cc/g) |
|---|---|---|---|---|---|
| 29 | 1.55 | 1.56 | .557 | 4.19 | 1.156 |
| 28 |  | 1.80 | .636 | 2.54 | 1.015 |
| 30 | 1.00 | .85 |  | .154 | .881 |
| 32 | 1.53 | 1.39 | .861 | .121 | .443 |
| 34 | 1.41 | 1.36 | .968 | 45.9 | .294 |
| 33 | 1.34 | 1.40 | 1.031 | .011 | .258 |
| 31 | 1.26 | 1.30 | 1.211 | .005 | .055 |

[1] Real density as determined by He pycnometry
[2] Real density as determined by Hg intrusion to 60,000 psi
[3] Apparent density as determined by Hg porosimetry
[4] Median pore diameter from Hg porosimetry
[5] Intrusion pore volume from Hg porosimetry The ingredients and processing of the materials in Table I are described in Table II, which follows hereinafter. of interest is the variation in pore size which I can obtain. In the materials in Table I, pore size varies by a factor of 10,000.

Also, I can obtain a considerable variation in apparent density ranging in the examples in Table II over a factor of 2. Furthermore, I have varied the interconnected pore volume accessible to Hg by a factor of 20 in these examples.

The examples show a general trend toward lower pore volume with finer pore size. However, this is not always true as can be seen by comparing example 30 with the others. It is, therefore, possible to change these two factors independently.

While the selectability of pore parameters is illustrated in Table I, no data are there presented for reproducibility, which is important for self-evident reasons. A high degree of reproducibility is, however, shown by tests in which six rods where produced as described in Example 28, Table II in separate molds. The measured apparent densities were all within 0.3 percent. Repeatability in apparent density has been demonstrated in successive batches to be within 0.5 percent. Spatial variations within given pieces have been measured at less than 0.5 percent.

Such high uniformity and reproducibility, such variations in pore regime and densities, and independent control of pore size and volume are all unique to my process as is the ease with which the characteristics of the artifacts I produce may be modified.

The capability for independently controlling different parameters in the pore regime is important for self-evident reasons in applications such as those disclosed in my above-cited issued patents. It is also of signal importance in other applications of my novel bodies in that this capability affords ready control over many properties of the bodies such as density, surface area, hardness, compressive and tensile strengths, modulus of elasticity, etc.

In addition to the essential steps culminating with pyrolysis of the consolidated shape, other steps may be used in my process to alter the characteristics of or impart additional properties of the final product. These, which will be discussed in detail hereinafter, include:

Conditioning of the castable fluid;

Conditioning of the body obtained by the consolidation step;

Machining and other shaping of the consolidated and pyrolized body;

Reinfiltration of the pyrolized body, alone or with subsequent treatment of the reinfiltered body.

In addition to the process steps, the constituents employed are also of signal importance in the practice of my invention. The essential ingredients are:

A carbon yielding binder;

A liquid pore former;

A dispersing agent.

Depending upon the particular nature of the foregoing ingredients and other considerations such as the properties wanted in the carbonaceous body, one or more optional ingredients may also be employed. These include:

Consolidation agents;

Fillers (solids or dispersable liquids);

Foam killing agents;

Wetting agents;

Accelerators.

Wide latitude exists in the constituents which may be employed in the practice of the present invention. Nevertheless, each of these must have certain well-defined characteristics, particularly in the case of the essential ingredients as will become apparent from the ensuing detail discussion of my invention.

In this discussion the reader's attention will frequently be directed to the above-referred-to Table II. In this Table, a number of representative procedures which were actually used to make different artifacts and which illustrate various aspects of my invention are summarized in tubular form.

For Table II, I have selected certain specific procedures from among many hundreds I have satisfactorily employed. These procedures have been chosen to illustrate a wide range in both ingredients and process steps, but are only representative and not intended to place any restrictions on the scope of the invention, which is meant to be limited only by the appended claims.

TABLE II

| Example number | Ingredients | | | | | Blend | Mill | Fluid conditioning | | | | | Consolidate | Solid conditioning | | Pyrolysis | $\rho_a$, g./cm.³ |
|---|---|---|---|---|---|---|---|---|---|---|---|---|---|---|---|---|---|
| | Binder | Pore former | Dispersing agent | Consol. agent | Fillers | | | Debubble | Hold | Hold | Cast | | | Hold | Hold | | |
| 1 | 1–1,927g | H₂O 4,979m | 2–32m | None | Graph-4 4,000g | 20 min M.S. | 50 min C.M. | | 5d RT | 1h 10° | 10° | –11° | RT 1d | 75°–12h Air | 2,100° N₂ | .561 |
| 2 | 1–3g 15–1g | H₂O 7.0m | 2 | None | Graph-16 5g | 15 min H.S. | | | 1h RT | | RT | –11° | RT 1d | 75°–24h Air | 2,100° N₂ | |
| 3 | 1–481g 35–100g | H₂O 1,444m | 2–8m | None | Graph-4 1,000g | 5 min M.S. | 30 min C.M. | 5 | 1d RT | | RT | –11° | RT 1d | 75°–24h Air | 2,100° N₂ | .541 |
| 4 | 1–4.8g 6–2g | H₂O 4.45m | 2 | None | Graph-4 5g | 5 min H.S. | | | 10 min RT | | RT | –15° | RT 1h | 65°–2h Air | 2,100° N₂ | .706 |
| 5 | 1–602g 7–100g | H₂O 1,356m | 2 | None | Graph-4 1,000g | 15 min M.S. | | | 6d RT | | RT | –11° | RT 1d | 75°–1d Air | 2,100° N₂ | .546 |
| 6 | 36–1g | H₂O 8m | 8–.5m | None | Graph-4 5g | 5 min M.S. | | | 10 min RT | | RT | –15° | RT 1h | 105°–2h Air | 2,100° N₂ | .670 |
| 7 | 1–4.2g | H₂O 6.9m | 2 | None | 4–3g 9–.5g | 5 min H.S. | | | 10 min RT | | RT | –15° | RT 1h | 65°–4h Air | 2,100° N₂ | .566 |
| 8 | 10–264g | H₂O 922m | 11 | None | 4–500g | 15 min M.S. | 30 min C.M. | | 1d RT | | RT | –11° | RT 1d | 75°–1d Air | 2,100° N₂ | .508 |
| 9 | 1–602g | H₂O 1,256m | 2–8m | None | 4–1,000g TiO₂–600g | 15 min M.S. | 1h C.M. | | 1d RT | | RT | –11° | RT 1d | 75°–1d Air | 2,100° N₂ | .623 |
| 10 | 1–602g | H₂O 1,256m | 2–8m | None | 4–1,000g ZrO₂–600g | 15 min M.S. | 1h C.M. | | 1d RT | | RT | –11° | RT 1d | 75°–1d Air | 2,100° N₂ | .696 |
| 11 | 1–602g | H₂O 1,256m | 2–8m | None | 4–1,000g Nb₂O₅–600g | 15 min M.S. | 1h C.M. | | 1d RT | | RT | –11° | RT 1d | 75°–1d Air | 2,100° N₂ | .655 |
| 12 | 1–602g | H₂O 1,256m | 2–8m | None | 4–1,000g NiO–200g | 15 min M.S. | 1h C.M. | | 33d RT | | 10° | –11° | RT 1d | 75°–1d Air | 2,100° N₂ | .640 |
| 13 | 1–482g | H₂O 1,245m | 2–8m | None | 4–1,000g MoO₃–200g | 15 min M.S. | 1h C.M. | | 11d RT | | 10° | –11° | RT 1d | 75°–1d Air | 2,100° N₂ | .680 |
| 14 | 1–063g | H₂O–963m 12–80m | 2 | None | 4–2,000g | 15 min M.S. | 1h C.M. | | 11d RT | | 1° | –11° | RT 1d | 75°–1d Air | 2,100° N₂ | .572 |
| 15 | 1–12g | H₂O–27m | 2–32m | None | 4–20g V₂O₅–4g | 15 min M.S. | 25 min C.M. | | 8d RT | | RT | –11° | RT 1d | 70°–1d Air | 2,100° N₂ | .676 |
| 16 | 1–4.8g | H₂O–12m | 2–6m | | 4–10g 17–3m | 15 min H.S. | | | 1h RT | | RT | –11° | RT 1d | 65°–1d Air | 2,100° N₂ | .504 |
| 17 | 13–176m | 8–626m | 8–45m | 14–17.2g | 4–391g | 45 min C.M. | | RP | 45 min RT | | 85° | 85° | 2h–85° Air-Ad | | 2,100° N₂ | .589 |
| 18 | 13–80m | 8–240m | 8–20m | 14–10g | 4–160g | 1h C.M. | | RP | 45 min RT | | 85° | 95° | 2h–95° Air-Ad | | 2,100° N₂ | .644 |
| 19 | 13–80m | 8–260m | 8–20m | 14–10g | 4–160g | 1h C.M. | | RP | 45 min RT | | 85° | 95° | 2h–95° Air-Ad | | 2,100° N₂ | .595 |
| 20 | 13–80m | 8–280m | 8–20m | 14–12g | 4–160g | 1h C.M. | | RP | 45 min RT | | 85° | 95° | 2h–95° Air-Ad | | 2,100° N₂ | .590 |
| 21 | 13–80m | 8–326m | 8–20m | 14–10.6g | 4–160g | 1h C.M. | | RP | 45 min RT | | 85° | 95° | 2h–95° Air-Ad | | 2,100° N₂ | .536 |
| 22 | 13–600m | 8–2,550m 12–200 | 8–150m | 14–73g | 4–1,500g MoO₃–200g | 3.5h C.M. | | RP | 45 min RT | | RT | 85° | 3.5h–85° Air-Ad | | 2,100° V–C | .622 |

TABLE II – Continued

| Example number | Ingredients | | | | | Blend | Mill | Fluid conditioning | | | | Cast | Consoli-date | Solid conditioning | | Pyrolysis | $\rho_a$, g./cm.$^3$ |
| | Binder | Pore former | Dispersing agent | Consol. agent | Fillers | | | Debubble | Hold | Hold | Hold | | | Hold | Hold | | |
|---|---|---|---|---|---|---|---|---|---|---|---|---|---|---|---|---|---|
| 23 | 13-675m | 8-2,550m 12-400m | 8-150m | 14-82g | 4-1,500g MoO$_3$-600g | 75 min C.M. | | RP | 45 min RT | | | RT | 95° | 4h-95° Cl. | 24h Air-Ad | 2,100° V-C | .692 |
| 24 | 13-562m | 8-2,000m 12-167m | 8-143m | 14-51g | 4-1,250g MoO$_3$-167g | 30 min C.M. | 60 min C.M. | RP | 45 min RT | | | RT | 95° | 3h-95° Cl. | 48h Air-Ad | 2,100° V-C | .636 |
| 25 | 13-562m | 8-2,000m 12-167m | 8-143m | 14-51g | 4-1,250g MoO$_3$-167g | 30 min C.M. | 105 min C.M. | RP | 45 min RT | | | RT | 95° | 3h-95° Cl. | 48h Air-Ad | 2,100° V-C | .636 |
| 26 | 32-80m | 18-280m | 18-18m | 14-9g | 4-176g | 60 min C.M. | | | 5h RT | | | RT | 85° | 12h-85° Cl. | 48h Air-Ad | 2,100° V-C | .582 |
| 27 | 13-333m | 19-467m | 19-85m | 20-20g | MoO$_3$-200g | 10 min C.M. | | | 8 min 49° | | | 50° | 81° | 16h-85° Cl. | 24h Air-Ad | 2,000° N$_2$ | .650 |
| 28 | 13-250m | 19-500m | 19-160m | 20-15g | 21-375g 9-3.7g | 30 min C.M. | | RP | 10 min 29° | | | 30° | 95° | 20h-95° Cl. | 48h Air-Ad | 2,000° N$_2$ | .636 |
| 29 | 13-250m | 19-600m | 19-150m | 20-15g | 21-375g | 65 min C.M. | | RP | 10 min 27° | | | 30° | 97° | 20h-97° Cl. | 48h Air-Ad | 2,000° N$_2$ | .557 |
| 30 | 13-50m | 19-23.5m | 22-71.5m | 20-6g | 28-15m | 5 min H.S. | | | 60 min 20° | | | 21° | 93° | 20h-97° Cl. | | 2,000° N$_2$ | |
| 31 | 13-100m | 19-50m | 24-50m | 20-6g | None | 10 min M.S. | | | 27h RT | 30h 60° | | 60° | 65° | 48h-70° Air-Ad | | 2,000° N$_2$ | 1.211 |
| 32 | 13-60m | 25-60m | 25-30m | 20-7.2g | None | 10 min M.S. | | | 24h RT | 3h 60° | | 60° | 65° | 2h-70° Cl. | 24-70° Air-Ad | 2,000° N$_2$ | .861 |
| 33 | 13-60m | 26-60m | 26-30m | 20-7.2g | None | 10 min M.S. | | | 24h RT | 8h 60° | | 60° | 65° | 2h-70° Cl. | 24h-70° Air-Ad | 2,000° N$_2$ | 1.031 |
| 34 | 13-60m | 27-60m | 27-30m | 20-7.2g | None | 10 min M.S. | | | 24h RT | 8h 60° | | 60° | 60° | 48h-70° Cl. | | 2,000° N$_2$ | .968 |
| 35 | 13-60m | 28-60m | 28-30m | 20-7.2g | None | 10 min M.S. | | | 24h RT | | | 60° | 60° | 48h-70° Cl. | | 2,000° N$_2$ | .744 |
| 36 | 13-675m | 8-1,725m 29-900m | 8-500m | 14-67g | 4-1,500g 30-210m | 90 min C.M. | 20 min C.M. | RP | 1h 60° | | | 60° | 60° | 48h-70° Air-Ad | | 2,000° N$_2$ | .589 |
| 37 | 13-100m | 31-50m | 24-50m | 20-12g | None | 15 min M.S. | | | 6h 26° | | | 35° | 35° | 6h-50° Cl. | 6d-70° Air-Ad | | |
| 38 | 32-900m | 27-450m | 24-450m | 20-102g | None | 15 min M.S. | | RP | 2h 17° | 29h 40° | | 60° | 76° | 4d-70° Cl. | | 2,000° N$_2$ | 1.06 |
| 39 | 32-400m | 19-360m | 24-40m | 20-45g | None | 15 min M.S. | | RP | 2h 20° | 20h RT | | RT | 70° | 6d-70° Cl. | 6d-95° Air | 2,000° N$_2$ | .911 |
| 40 | 32-400m | 19-300m | 24-100m | 20-45g | None | 15 min M.S. | | RP | 2h 20° | 24h RT | | RT | 70° | 5d-70° Cl. | 6d-95° Air | 2,000° N$_2$ | .835 |
| 41 | 32-600m | 19-300m | 24-300m | 20-102g | None | 15 min M.S. | | RP | 2h 20° | 30h RT | | RT | 50° | 4d-70° Cl. | 1d-95° Air | 2,000° N$_2$ | 1.25 |
| 42 | 32-100m | 19-3m | 19-3m | 20-2g | None | 15 min M.S. | | | 80 min 30° | 15h RT | | RT | RT | 1d-70° Cl. | 3d-95° Air | 2,000° N$_2$ | |
| 43 | 13-11m | 8-50m | 24-50m | 20-6.7g | None | 20 min M.S. | | RP | 4h RT | | | 35° | 40° | 12h-50° Cl. | 7d-70° Cl. | 2,000° N$_2$ | |
| 44 | 33-100m | 19-150m | 19-50m | 20-6g | None | 15 min M.S. | | RP | 5h RT | 12h 35° | 4.5h 50° | 50° | 50° | 6d-70° Cl. | 5d-95° Air | 2,000° N$_2$ | |

TABLE II – Continued

| Example number | Ingredients | | | | | Fluid conditioning | | | | Cast | Consolidate | Solid conditioning | | | Pyrolysis | $\rho_a$, g./cm.$^3$ |
|---|---|---|---|---|---|---|---|---|---|---|---|---|---|---|---|---|
| | Binder | Pore former | Dispersing agent | Consol. agent | Fillers | Blend | Mill | Debubble | Hold | Hold | | | Hold | Hold | Hold | |
| 45 | 13-500m | 19-500m 19-50m | 19-875m | 20-6g | None | 10 min M.S. | | | 15 min 30° | 70° | 70° | 13h-70° Cl. | 9h-98° Air | 431° N$_2$ | .462 |
| 46 | 32-150m | 22-100m | 19-53m | 20-17g | 34-120g | 10 min M.S. | | RP | 42h RT | RT | RT | 2d-70° Cl. | 21d-95° Air | 2,000° N$_2$ | 1.094 |
| 47 | 32-400m | 19-360m | 24-40m | 20-45g | None | 15 min M.S. | | | 2h 20° 20h RT | RT | 70° | 6d-70° Cl. | 6d-95° Cl. | N700° N$_2$ | .846 |

NOTE: All temperatures in Table II are in degrees centigrade.

EXPLANATION OF ABBREVIATIONS

1. — Polyvinyl Chloride in water latex — PLIOVIC 300, Goodyear.
2 — Emulsifier in latex 1 — "Synthetic anionic" of undisclosed character.
3 — Nopcosant L — anionic water soluble polymer, Nopco Chemical Company.
4 — Graphite flour, Union Carbide Corp. — Grade No. 38.
5 — Foam Killer — Silicone Spray, Anti foam A, Dow Corning Corp.
6 — Coal Tar Pitch, water emulsion.
7 — Polyurethane powder.
8 — Non-ionic emulsifier of Alkyl Ether Ester type, Werner G. Smith, Inc.
9 — Fine SiO$_2$ particles — Cab-O-Sil, Cabot Corp.
10 — Vinyl Chloride Copolymer — Geon 351, B. F. Goodrich Chemical Co.
11 — "Anionic" emulsifier incorporated in Geon 351.
12 — Glycerine — technical grade.
13 — Polyfurfural alcohol resin — Durez 16470, Hooker Chemical Corp.
14 — Polymerization Accerator for polyfurfural alcohol resins — Durez No. 17932 designed for Durez 16470 Resin, Hooker Chemical Corp.
15 — Polyvinyl Methyl Ether — Gantrez M-154, General Aniline Film Corp.
16 — Graphite flour, Union Carbide Corp. — Grade No. 48.
17 — Zirconium Acetate solution containing 22 percent ZrO$_2$, National Lead Co., TAM Division.
18 — Oleic acid.
19 — Diethylene glycol.
20 — Paratoluene sulfonic acid.
21 — Carbon powder made by millng composition of example 27.
22 — Polyethylene glycol — average molecular weight 300.
— Gycerol Borate containing .5gm H$_3$BO$_3$ per ml.
24 — Triton X-100 — non-ionic emulsifier — water soluble isooctyl phenoxy polyethoxy ethanol, Rohm and Haas Co.
25 — Triethylene glycol.
26 — Tetraethylene glycol.
27 — Propylene glycol.
28 — Dipropylene glycol.
29 — Kerosene.
30 — Suspension of fine MoO$_3$ in glycerine heated for 24 hours at 95°C.; contained 150g oxide and 150ml glycerine before reaction (suspension changed color indicating partial reaction between the components).
31 — Ethylene glycol.
32 — Furfural alcohol monomer, Quaker Oats Co.
33 — Phenolic Resin — Varcum 8142, Reichold Chemicals, Inc.
34 — Carbon from example 45.
35 — Polyvinyl Alcohol Powder.
36 — Corn starch.
H.S. — Hand Stir.
M.S. — Mechanical Stirrer.
C.M. — Epenbach-type colloid mill.
R.T. — Room temperature.
R.P. — Reduced Pressure — approximately 100 mm Hg.

Ad — Samples heated in contact with liquid absorbing media.
VAC — Vacuum — pressure less than 10 microns Hg.
Cl. — Fluid retained.
g — Grams.
m — Milliliters.
h — Hours.
d — Days.
$P_a$ — Apparent density.
V-C — in vacuo followed by cooling.

The first of the essential ingredients employed in my novel process is the "carbon yielding binder." As used herein, the quoted term is employed to identify organic substances which, when heated to a high temperature in a non-oxygen containing atmosphere, will give a solid, carbonaceous residue. To be useful in my process the coke yield should be as high as possible, consistent with the other properties the binder must have. The materials I prefer yield about 50 percent carbon.

Many organic compounds that might be useful for binding structures at low temperature, such as methyl methacrylates and polyethenes, are not satisfactory since they are almost completely converted into gases upon heating (their coke yield at 905°C is about 0.2 percent). Riesz and Susman in Proceedings of the Fourth Conference on Carbon, p. 609 et seq., give a fairly extensive list of coke residues for various synthetic and natural resins; and reference can be had to this report for a list of organic materials which are satisfactory for my purpose considered solely from the viewpoint of coke yield.

In order for a binder material to be useful in my process, it must, in addition to having a satisfactory yield, be capable of being uniformly dispersed in a fluid blend. This characteristic is by no means processed by all organic substances with high coke yields. Also, the binder cannot be chosen independently of the other ingredients of the fluid mix and must meet other process requirements such as those involved in the casting and consolidation steps.

The binder may be dispersed by dissolving or mechanically suspending it in the fluid portion of the mixture. Fortunately, I have found a large number of high coke yielding binders that can easily be dispersed, either alone or with the aid of readily available dispersing agents. Also, as will become apparent hereinafter, I have discovered that auxilliary dispersing agents can be employed to effect the dispersion of binders in liquid systems which are otherwise suitable, but not capable of effecting the necessary dispersion.

By far the most limiting characteristic required of the binder is that there be a convenient way for it to bond into a continuous network with the carbon in a spatially uniform distribution. Many organic binders suitable for my purposes are liquid resins. In the case of the liquid resins I employ, the formation of the network is accomplished by a polymerization mechanism. The preferred embodiments of my invention employ thermosetting polymers, but I have also disclosed useful binders which are thermoplastic polymers (Examples 1–5 and 7–16, Table II).

I have also successfully employed solid binders such as polyvinyl chloride, polyvinyl alcohol, polyurethane, coal tar pitch, and cornstarch (Examples 1–16), although liquid binders are preferred. Also liquid binders of low viscosity (below 250 centipoises) are generally the most satisfactory.

It is desirable to use a binder with a low enough vapor pressure to make the loss of binder and/or bubble formation negligible during any warming required in the conditioning of the fluid or in the consolidation of the cast mixture. While the temperatures in these steps are in the preferred cases generally below 100°C the times may be prolonged (30 hours or more) making the low vapor pressure requirement of considerable importance.

Other important considerations are that the binder be relatively non-toxic and non-corrosive and that it be cheap in terms of the cost per unit weight of carbon yielded.

I have satisfactorily employed as binders in my process both monomers and resins, along and in various combinations. I have also used wide ranges of binder concentration.

The following are representative of the binders which may be used:
Furfural
Furfural alcohol
Furfural alcohol resins
Furfural resins
Polyvinyl chlorides
Polyvinyl acetates
Polyvinyl alcohols
Polyvinyl butyrates
Starches
Methyl vinyl ether polymers
Methyl vinyl ether/maleic anhydride polymers
Polyvinyl ester/styrene blends
Modified phenolic resins
Protein colloids[1]
Mixtures of the foregoing
Other organic substances may of course be employed as binders as long as they meet the criteria listed above.

[1] A number of protein colloids are described in Swift & Company Publications PO Form C 1443 11265 and PO Form C 1756.

The percentage of the binder employed in the fluid mixture will vary from application-to-application. I have thus far satisfactorily employed concentrations ranging from 5 to 95 percent of the mixture by volume.

The second of the essential ingredients employed in my novel process is the liquid pore former. A necessary condition for a satisfactory pore forming liquid is that it alone, or with the dispersing agent and/or binder employed in the fluid mixture, be capable of forming a macroscopically uniform, continuous phase throughout the castable fluid blend. The liquid pore former may form a solution with the other ingredients as when diethylene glycol is used as a pore forming liquid with a furfural alcohol binder and Triton X-100[2] as a dispersing agent (Examples 39–41). It may also form a dispersion as where the pore former is water, the binder is polyvinyl chloride, and the dispersing agent is Nopcosant L[3] (Examples 1, 3, 9–13, and 15).

[2] Triton X-100 is a non-ionic emulsifier and wetting agent available from Rohm and Haas Co. It is a water-soluble isooctyl phenoxy polyethoxy ethanol containing 10 moles of ethylene oxide and is described in more detail in Technical Bulletin No. SAN 227-2 (March 1967).
[3] Nopcosant L is an ionic, water-soluble polymer available from Nopco Chemical Company and described in its Bulletin PC-35.

A pore former that separates within the fluid mixture such as ethylene glycol does when employed with a furfural alcohol resin and no dispersing agent is not satisfactory. Also, pore formers which form droplets as glycerin does when mixed with furfural alcohol resins are not satisfactory.

The pore former can be used to control the amount of pores present in the consolidated body by adjusting its volumetric concentration in the original blend. In this way the apparent density of the body can be varied.

The density of the final pyrolyzed body does not decrease in direct proportion to the increase in the is affected to some extent by the volume of the pore former constituent. However, the amount of shrinkage is readily ascertainable and can be taken into account in the formulation of the fluid casting mixture or elsewhere in the process (See Examples 18-21).

The basic function of the liquid pore former is to lower the volumetric concentration of carbon producing binder in the fluid blend. In order to satisfactorily perform this function it must necessarily be uniformly distributed throughout the fluid mixture and therefore must be used in conjunction with a suitable dispersing agent if it does not by itself have this additional property.

Another necessary condition is that the pore forming liquid have a low viscosity. Those I prefer have viscosities below 1,000 centipoises[4.] [4] When fillers are incorporated in the fluid mixtures, the use of pore formers with very low viscosities can be disadvantageous unless very fine particles or extremely effective dispersion agents are employed because of the tendency of the filler to settle out.

Another important property required of the pore forming liquid is a high flash point so that the steps of the process involving heating can be safely carried out. In addition, the vapor pressure of the pore former liquid should be low so that bubbles will not be formed in the process or material lost by vaporization.

A high resistance to oxidization is also desirable so that the process steps may be carried out in air. The liquid pore former should further be inexpensive, non-toxic and non-corrosive.

I have also found that the liquid pore former should have a high degree of solubility for the agents used to catalyze the polymerization reactions which occur in the consolidation step in those embodiments of the invention involving consolidation by polymerization. This permits a very uniform distribution of the polymerization catalyst throughout the castable blend to be obtained and, therefore, results in a much more uniform structure.

Where consolidation is carried out by freezing, the pore former must also permit the continuous phase to be formed by freezing at a reasonable temperature.

The foregoing requirements severely limit the liquid pore forming materials suitable for my process. However, I have found a number of satisfactory liquids. Examples of these are included in Table II.

The following list also identifies other pore former liquids which are representative of those that I have employed in the practice of the present invention;
Octyl alcohol
Hexylene glycol
1,5-Pentanediol
2-Ethyl-1,3-hexanediol
Butanol
Ethoxytriglycol
Methoxytriglycol
1,3-Butylene glycol
Polyethylene glycols having molecular weights above 300
Triton X-100
Atlox 1045A[5]
Fluid polysilicates[6]
Solutions in which one of the foregoing or one of the pore forming liquids identified in Table II is a solvent or a solute.

[5] A polyoxyethylene sorbitol oleatelaurate surfactant produced by Atlas Chemical Industries, Inc.

[6] For example, Silbond EX 40 and H6, Stauffer Chemical Company

Many emulsifying liquids intended for uses in small amounts in other chemical systems have all of the characteristics required of the liquid pore formers employed in my castable fluid systems. Such emulsifiers include many of the glycols and a wide variety of commercial emulsifiers, a number of which are identified in Table II.

In addition to being pore forming liquids, those liquid materials of the emulsifier type described above are excellent dispersants as are a number of other liquids. By employing appropriate amounts of this type of material, the same liquid can be used in a dual capacity as a pore forming liquid and as a dispersing agent in the castable mixtures from which my novel carbonaceous bodies are made. Examples of these dual capacity ingredients are included in Table II. They are:
Werner G. Smith non-ionic emulsifier
Oleic acid
Diethylene glycol
Triethylene glycol
Tetraethylene glycol
Propylene glycol
Dipropylene glycol The dispersing agent is of course the third essential ingredient of the fluid castable mixture. A dispersing agent, as used in my process and as defined herein, is a fluid which, when blended with the binder and liquid pore former, will produce a mixture having a uniform distribution of the ingredients and also having a continuous liquid phase of the character described above. The dispersing agent must make the mixture capable of remaining in this form during any holding periods that may be required for fluid conditioning and/or for consolidation of the mixture after casting whether or not heating is involved. The dispersant also must be capable of uniformly dispersing any fillers added to the fluid mixture.

A combination of dispersing agents may be desirable or necessary. For example, I may employ binders in the form of a dispersed latex. In forming a castable liquid mixture from such a dispersion I may nevertheless add an additional dispersant such as Nopcosant L to the blend to insure that a uniform dispersion of the ingredients is obtained (Examples 1, 3, 9-13, and 15, Table II).

In some cases it is possible to dispense with the dispersing agent. I have found that ultrasonic excitation is reasonably successful in dispersing furfural alcohol resin in kerosene. However, the addition of a dispersant (the Werner G. Smith, Inc. alkyl ether ester non-ionic emulsifier) to a similar system (Example 36) produced much greater stability.

The importance of the dispersing agent to my process is dramatically illustrated by the system employing ethylene glycol as a pore forming liquid for a furfural alcohol resin binder. This system is entirely unsatisfactory because a uniform dispersion cannot be obtained. However, merely by adding Triton X-100, a satisfactory dispersion can readily be obtained (Example 37).

In systems employing propylene glycol as the liquid pore former and furfural alcohol binders the dispersion is marginal (Example 34). Again, however, additions of Triton X-100 make this type of system very stable (Example 38).

In addition to the characteristics just discussed, the dispersing agent must meet the requirements relating to corrosion, vapor pressure, etc., set forth above in the discussions of the other ingredients of the castable mix.

In the investigation of various dispersing agents I discovered an unpredicted and very useful result; viz., that it is possible to control the size of the pores in the final structure by controlling the concentration of dispersing agent. For example, in systems employing diethylene glycol and furfural alcohol binders, successively larger amounts of Triton X-100 decreases the pore size (Examples 31 and 39–41). In systems using propylene glycol and a furfural alcohol type binders, a similar effect was obtained.

A striking result also occurs when two effective dispersing agents are used. In one system employing furfural alcohol binder dispersed in diethylene glycol in an amount sufficient to make it both a dispersant and a pore former, the finished product had a pore size of about four microns with a narrow size distribution (Example 27). As Triton X-100 was added in successively larger amounts with all other factors held constant, the pore size decreased steadily until it reached 0.0046 microns at a volume percent of the Triton X-100 in the dispersant-pore forming liquid of 50 percent (Example 31). Thus, a simple adjustment in the ratio of starting ingredients results in a thousand-fold change in mean pore diameter.

Similar useful results can be obtained with other combinations of ingredients. Polyethylene glycols in general are excellent dispersing agents for both furfural alcohol and its resins. In have been able to control the size of the pores by adding a larger percentage of polyethylene glycol to the fluid mix and by employing glycols of higher molecular weight.

As will be apparent from the foregoing, there are many liquids which can be employed as dispersants in the practice of the present invention in addition to those specifically identified above. Other representative dispersants are identified in Table II.

The percentages of liquid pore former and dispersing agent employed in the castable mixtures from which my novel carbonaceous bodies are made can vary widely. I have thus far successfully employed volume percentages ranging from 5 to 91 percent.

It was pointed out above that a variety of optional ingredients may also be incorporated in the castable mixtures employed in my process. One class of such ingredients if that which I identify as "fillers" or "filler ingredients."

It is often desirable to add one or more fillers to the original blend so that the shaped porous body will have specific characteristics. For example, the addition of silicon dioxide or silicon to the blend gives a body which, after pyrolysis to very high temperatures, contains silicon carbide. This constituent imparts hardness and oxidation resistance to the body. Many metallic or metal oxides present in carbon bodies act as catalysts for subsequent graphitization. Such metallic materials can be added to the initial fluid mixture in my process to provide a graphitization catalyst in the porous body.

In bodies to be used in my patented carbide forming process other materials may be added to the initial mixture to aid wettability and control reactivity, and to supply alloying elements at low cost.

Ingredients may be added in the metallic state, or as oxides, sulfides, sulfates, carbides, carbonates, nitrides, nitrates, phosphides, phosphates, borides, borates, silicides, silicates, etc. In fact, my process is ideally suited for the addition of most solids since there is always a dispersing agent present, usually in a large amount, to facilitate the uniform distribution of the filler or fillers.

The oxides I have used as additives include $V_2O_3$, CuO, $V_2O_5$, MgO, $TiO_2$, $CrO_3$, $WO_3$, $Mb_2O_5$, $SiO_2$, NiO, $Cr_2O_3$, $Al_2O_3$, and $MoO_3$ (See Examples 22, 23, 24, 25, and 36). The last two of the foregoing also function as consolidation agents in that they catalyze the polymerization reactions as consolidation agents (Example 36).

Solid carbonaceous materials are particularly useful as filler materials in my process. The addition of high carbon yielding substances to the original blend can be used to particular advantage to increase the overall carbon yield; to control the mechanical, physical, and chemical properties of the carbonaceous body; to reduce the shrinkage; and to produce a body with a tailored pore size spectrum.

My systems are ideally suited to additions of solid, high carbon yield materials, again because they usually contain large amounts of dispersion agents. Any such material that can remain uniformly suspended is useful, and I have satisfactorily used a wide range of high carbon yielders including pitches, carbon blacks, graphites, intercalation compounds of graphite, polyvinyl chloride, polyvinylidene chloride, phenolformaldehydes, starches, gilsonite, and other synthetic and natural polymers, both before and after they have been carbonized to various degrees including graphitization. Systems employing fillers of the character just described are included in the examples in Table II.

For many applications including the making of infilterable skeletons for my patented carbide forming process I prefer carbonaceous fillers made from bodies produced by the process disclosed herein. Particulate material obtained by machining, grinding, or crushing the porous bodies I obtain after consolidation, after conditioning, and after pyrolysis have characteristics which make them especially desirable filler materials. For example, with my process, I can readily obtain porous carbonaceous bodies consisting of almost spherical particles of ca. 4 micron diameter which can be easily separated (especially after early stages of pyrolysis) to yield an almost monodispersed spherical powder (Example 45). A body made with this powder as a filler (Example 46) exhibited a very high hardness (240 VHN at 10KG) and did not crack under the hardness indenter, even at loads of 50 KG. Furthermore, the impression appeared to completely recover. No other carbonaceous materials of which I am aware will match this behavior.

Since bodies made by my process have a controllable pore volume and size over wise ranges, it is possible to tailor material with any desired pore size and bi- and other multiple pore spectra by using fillers of the type described in the preceding paragraph. For example, a body having a 0.01 micron pore size can be crushed to a 10 micron powder and used as a filler to make a body having 10 micron pores between the filler particles. The end product is a cohesive body having a selectable volume of 10 micron pores and an independently selectable volume of 0.01 micron pores with both sets of pores uniformly distributed in the body. Such structures have obvious advantages as catalysts and catalyst supports, filters, absorption bodies and fuel cell electrodes and in other applications where maximum accessibility to the pores is desired.

Also, as there are opportunities for shaping the body in my process, macroscopic channels can be formed along with the multiple sets of different sized pores. The resulting cohesive structures have extremely high surface area to volume ratios and obvious advantages over heretofore available systems with high surface area to volume ratios, which must be used in finely divided particulate form.

The fillers added to the fluid blend in my process need not be solids if they are soluble or otherwise uniformly dispersable in one or more of the other ingredients and can be converted to solids in one of the later process steps.

Examples of such fillers include various organometallic compounds which will dissolve in the binder, pore forming liquid, or dispersing agent such as glyceryl borate, (Example 30), ammonium metatungstate dissolve in diethylene glycol, ethyl polysilicate, zirconium acetate (Example 16), pre-hydrolyzed ethyl silicate in ethylene glycol ethyl ether, titanyl chloride in solution, zirconyl hydroxynitrate in solution, acetato zirconyl chloride, basic zirconyl nitrate, ammonium zirconyl carbonate, tetraisopropyl titanate, and various solutions of tungstates and molybdates (Example 3b).

The advantage of adding fillers in liquid form is that finely divided solids uniformly distributed throughout the body can be obtained. For example, colloidal silica can be produced by using a soluble silicate and heating the shape obtained by consolidation of the cast mixture. This silica reduces shrinkage in pyrolysis and can with still further heating be converted to silicon carbide.

Another advantage of employing liquid or soluble fillers is that many of them, including a number listed above, also function as polymerization catalyst type consolidation agents.

Another class of ingredient which can often advantageously be added to the fluid mixtures initially formed in my process are the just-mentioned "consolidation agents." This term is intended to cover any ingredients which may be added to the initial mixture to consolidate the cast fluid.

In consolidation by freezing, consolidation agents are not essential. However, even in such cases, agents such as silver iodide can advantageously be added to the initial fluid mixture to control the freezing nucleation.

In several other systems no consolidating agent is needed. I have employed ionizing radiation to consolidate systems containing furfural alcohol type binders. This technique is advantageous in that cross-linking can be promoted without the generation of heat.

Also, furfural alcohol resins and other binders can by polymerized by the application of heat alone although consolidation proceeds slowly. For example, I have successfully consolidated furfural alcohol resin/glycol systems with prolonged heating at 150°C.

Usually, however, I employ a consolidating agent to promote or catalyze polymerization in embodiments of my invention in which consolidation is effected by this mechanism. Typically, the consolidating agent will be of acidic character as such materials are known to accelerate the polymerization of furfural type, and other binders. I have successfully employed all of the common mineral acids, various organic acids, and various proprietary materials of undisclosed composition as polymerization type consolidation agents.

In many cases I prefer to use para toluene sulfonic acid as the consolidation agent. This material is a solid at room temperature but is quite soluble in my preferred pore forming and dispersing liquids. It can therefore be conveniently and uniformly distributed in the initial mixture even in very high concentrations.

The disperse nature of my fluid solution also allows me to use high proportions of acid to binder (5–60 percent or higher), a technique which is usually not possible in prior art polymerization processes because it results in unmanageable exothermic reactions. The high proportions of acid permit me to effect rapid, controllable consolidation in furfural alcohol and other systems, generally at temperatures of 100°C or lower.

This is significantly lower than the more usual range of 125°–175°C which must be employed to set the resins utilized in prior art processes in which the acid content in the mixture being set must be limited to 2 percent or less for shapes of larger cross-section. That I can effect rapid consolidation at low temperature has obvious advantages — for example, the lower temperature requirements places much less severe vapor pressure related and other limitations on the pore forming liquid, dispersing agent, and binder.

As indicated above, the initial step in my process is the blending of the binder and pore former and any fillers which may be employed with the dispersing agent. In this step the ingredients are mixed to form a homogeneous fluid[7] with a viscosity of less than 100 poises so that the mixture can flow into a mold cavity and form a shape free of macroscopically sized voids without application of pressure or vibration being necessary[8].

[7] Fluid is meant to include materials which contain solids as well as those which contain only liquids.
[8] The use of vibration and pressure may be undesirable because of the complexity introduced into the blending process.

Viscosities below the maximum specified above can easily be obtained, even with the addition of fillers in amounts of 40–60 percent by volume or higher, especially if the preferred binders, dispersants, and pore formers are employed.

Other factors being equal, mixtures with low viscosities are preferred. Low viscosities facilitate blending and minimize the trapping of bubbles.

I usually prefer to blend the dispersing agent into the liquid pore former and then add the consolidation agent, if one is employed. The binder is then added[9].

[9] I have found in this regard that a definite increase in the uniformity of the final structure can be obtained by first dispersing the polymerization catalyst in the liquid portion of the initial mixture and then blending in the binder.

In many cases the volume of the fluid pore former and dispersant will equal or exceed the volume or binder. This facilitates the blending step.

The foregoing is by no means the only order in which the ingredients may be incorporated in the liquid mixture. The relative volumes and mutual solubilities of the ingredients will often make it more convenient to add the ingredients in a different order.

After the mixture just described is formed any solid fillers which are to be used are added and uniformly dispersed. I may prewet the filler with the pore forming liquid or the dispersing agent before adding the filler to the liquid. Often this will keep air from being added in significant quantities to the mixture along with the filler.

Minor amounts of conventional defoamers can also be added in the blending step to eliminate air bubbles.

I have found an ordinary mechanical stirrer to be satisfactory for blending in most cases. Also, a colloid mill operating at low speed does an excellent job of uniformly blending the fluid mixture.

It is often desirable before casting the fluid mixture produced in the blending step to alter the characteristics of the mixture in a manner which will improve the quality of or impart specific characteristics to the final product.

First, it is usually desirable to remove any air trapped in the mixture in the blending operation. Such trapped air is particularly apt to be present in mixes containing substantial quantities of solid fillers.

Debubbling is to insure that the pores in the carbonaceous body will be formed only by liquid. Bubbles produce pores that are generally large with respect to the liquid formed pores (these are 200 microns or smaller). Furthermore, even very small bubbles in the blended mix tend to grow during subsequent steps involving heating; these bubbles are particularly prone to cause cracking during pyrolysis.

Most of the fluid mixes I employ are quite low in viscosity and easy to debubble. In fact, those with a high proportion of liquid pore former usually do not require debubbling. Also, the dispersants I employ usually cause complete wetting of the filler, making the only bar to eliminating bubbles the viscosity of the mix.

When debubbling is required, small additions of conventional foam killers are often helpful. I have also found that the application of a reduced pressure (for example, 100 mm Hg) to the fluid mixture is very effective in producing debubbling. Additionally, gentle warming can be advantageously employed so long as the temperature is not high enough to cause significant polymerization and increased viscosity.

Debubbling does impose some restrictions on the binder, pore former and dispersant, particularly if reduced pressure is employed. It is desirable that these ingredients have a low vapor pressure (high boiling point) as the reduction of the pressure on the mixture can otherwise result in the loss of material from the mix or in the formation of additional bubbles.

Another fluid mixture conditioning operation sometimes employed in my process is milling (this can be done in a standard colloid mill). The goals of milling are to reduce the size of filler solids and to produce a more uniform dispersion. Milling is preferably followed by debubbling to eliminate air introduced into the mixture by the milling operation.

By far the most important conditioning operation carried out on the fluid mixture is the holding of the mixture at a selected temperature when consolidation is by polymerization. Holding causes partial polymerization in the fluid mixture before it is cast.

Partial polymerization before casting has several distinct advantages over merely using a more completely polymerized resin as a starting material. First, the less polymerized binders can be more easily blended and debubbled. An additional advantage of the less highly polymerized binders is that they are less viscous and more easily dispersed. For example, highly polymerized furfural alcohol resins and more difficult to disperse and keep from settling than the monomer or the low molecular weight polymers. This advantage is particularly important where the dispersion is marginal.

It also appears that polymerization proceeds differently when carried out in the casting mixture rather than prior to mixing. In any event, holding can be employed to effect the character of the pyrolyzed product.

The major advantage of conditioning the castable mixture by holding is that a substantial portion of the heat of polymerization can be carried away while the mix is still fluid by convective heat transfer. This can be enchanced by stirring, although the stirring should be sufficiently gentle to not introduce bubbles.

By conditioning, the fluid mixture can be brought to a just castable consistency with a concurrent reduction in the heat which will be generated in the consolidation step. This significantly increases the size of bodies which can be consolidated. Bodies up to 6 inches × 6 inches have been successfully consolidated with proper conditioning of the fluid mixture, while less complete conditioning resulted in a delayed, uncontrolled heating and swelling of the cast fluid mixture in the consolidation step.

Conditioning also can be used to alter the pore size which will be present in the final product without changing the composition of the fluid mixture or otherwise altering the process steps.

Condition by holding involves different holding times and temperatures depending upon the composition of the fluid mixture, the characteristics to be imparted to its and the final product, etc. In systems I have thus far investigated, the fluid mixture has been held at temperatures ranging from $-15°$ to $150°C$ for periods of from a few minutes to several hundred hours.

Cooling the fluid mixture to a very low temperature ($5°$ to $-20°C$) after it has been brought to a castable state slows further reactions and allows the mixture to be stored for very long periods of time, which is an obvious convenience. Satisfactory results have been obtained where the mixture has been stored at low temperature for 6 months. In addition, holding at low temperatures also appears to have a beneficial and significant effect on the polymerization reaction mechanism.

The free flowing mixture produced in the blending step is cast to shape by placing it in a container capable of retaining all of the fluid mix. Because of its composition and free-flowing nature, the fluid forms a bubble and void-free body which adopts the shape of the container without vibration or the application of pressure.

Because my fluid mixtures are composed of ingredients that will not corrode or penetrate into common mold materials, glass, silicone rubbers, various polymers, aluminum alloys, stainless steels, and copper alloys are all well-suited for my purposes.

Casting is followed by a consolidation step in my process. In this step the free-flowing cast mixture is converted into a self-supporting, physically handleable body without slumping or settling and with no loss of material from the shape. This clearly differentiates my process from those employing slip casting, drying, and similar techniques and also results in the production of superior carbonaceous bodies.

The loss of material from the fluid mix either by penetration into the mold as in slip casting or by vaporization will introduce a spatially non-uniform volumetric concentration of the components. Settling will also result in a spatially non-uniform concentration. Spatial non-uniformity in the consolidated material is of course undesirable because of the resulting lack of uniformity in the final product.

It is desirable, but not mandatory, that consolidation be effected without significant volume change. While a small homogeneous shrinkage or expansion is tolerable since no spatial non-uniformity is introduced, the restraint offered by mold cores or the like can cause cracking if the linear shrinkage is too high.

I have successfully consolidated bodies with no easily measurable shrinkage or expansion by freezing the cast shape, by effecting polymerization at room temperature and at temperatures below and above room temperature, and by irradiation of the cast material.

The only structural requirement involved in the consolidation step is that the material be made capable of holding the shape to which it is molded. However, it is also highly desirable that the consolidation develop a high green strength to facilitate removal from the mold and handling of the casting.

The mechanism by which the consolidation process takes place depends on the binder selected. For example, mixtures employing polyvinyl chloride latex binders can be consolidated by freezing. Other latexes which can be consolidated by this technique include those disclosed in U.S. Pat. Nos. 3,236,788 to Smith-Johannsen and 3,376,158 to Buser.

When a freeze consolidatable latex is employed in my process, the time of holding and the exact temperature below the freezing point are not critical in the consolidation of the fluid mixture. I have found freezing variables such as rate ane presence of nucelation catalysts to be generally in line with the disclosure of U.S. Pat. No. 3,236,788.

In most of my preferred systems, consolidation of the cast material is caused by polymerization of the binder. The polymerization mechanism is not critical and will vary, depending upon the constituents present, concentrations, the temperature and pressure conditions under which the material is consolidated, etc.

Part or all of the binder may be in solution in the pore former and dispersant, at least prior to significant polymerization as when furfural alcohol is used, for example. As polymerization proceeds with the aid of heat, time, pressure, radiation, or catalyst, at least a portion of the binder is precipitated with precipitated material joining together to affect consolidation.

To form a satisfactory body, the binder must remain uniformly suspended in the pore forming-dispersant fluid until the consolidation is accomplished. This requires that the pore forming-dispersant fluid be selected with care, particularly as most of the convenient binders are heated modestly to reduce the consolidation time with an accompanying decrease in the viscosity which would hasten settling within the cast mixture.

Nevertheless, I have found many combinations of binders, pore formers and dispersants that are satisfactory. This is demonstrated in the fact that I have made many specimens in the form of 6 inch bars approximately ¾ inch in diameter from mixtures of widely different character which, in end-to-end checks of apparent density, showed less than ½ percent variation and no perceptible change in structure under the microscope.

In systems where dispersion is marginal (Example 34), there is a tendency for the fluid mixture to sink below the original fluid level, indicating that settling has taken place. In such cases, the lower end of the consolidated structure is more dense than the upper. However, the addition of upwards of 5 percent by volume of an auxiliary dispersant such as Triton X-100 was found to completely eliminate this problem with the added advantage that a much finer pore structure was obtained.

In at least one case where dispersion was adequate the consolidation was still unsatisfactory. In this case, a furfural alcohol resin binder was used with acetone as a pore former-dispersant. There was a loss of acetone by evaporation during the consolidation which caused the fluid cast material to shrink, finally yielding a body of greatly reduced volume.

I have found that, in addition to the factors discussed above, successful consolidation requires adjustment of the time and temperature to the binder and pore former-dispersant system. Very slow consolidation may not only result in settling but also allow convection patterns to develop in the cast mixture. These can produce spatial variations in density of sufficient magnitude to cause cracking in the pyrolysis step which follows consolidation.

By altering the time and temperature of consolidation and the amount and type of polymerization catalyst, it is possible to adjust for less than optimum binder and pore forming-dispersant characteristics by speeding the consolidation process. However, this is not without peril, particularly when large bodies are required. Because of the substantial heat given off in the polymerization reactions, there is a risk that the interior of the casting will get hot enough to send the polymerization out of control. This can cause swelling of the casting or cracking during consolidation and during subsequent steps. Cooling of the mold can be used to help solve this problem for thin sections, but is of no avail for thick sections due to the poor conductivity of the mix.

An alternate solution which entirely eliminates the problem is to condition the fluid mixture before it is cast as discussed above.

In my process the consolidated body can be directly pyrolyzed to effect pore formation and carbonization or can first be subjected to one or more conditioning steps. These are carried out to improve the quality of or impart specific properties to the final product and have the common characteristic that they do not cause the solids in the consolidated body to depolymerize or otherwise destroy the cohesive character of the consolidated body (in most cases the operations performed increase the polymerization in the body).

Most conditioning operations involve holding the consolidated body for appropriate times under specified temperatures and pressures and in specific environments. The major purpose of conditioning the consolidated body is to aid in controlling the subsequent pyrolysis; viz., to avoid the distortion that would often accompany pyrolysis immediately following the consolidation step.

Also, it is a definite economic advantage to be able to remove the cohesive body from the mold as soon as possible after the consolidation step. However, at this stage, its strength may still be low even though it is self-supporting. An additional holding period can be employed to impart additional strength to the body and thereby facilitate handling.

In my investigations to date, conditioning for the purposes just described has involved holding the consolidated body for periods of 1 to several hundred hours at temperatures of 10° to 180°C under pressures of 0.1mm Hg to 10 psi in contact with liquid and gaseous absorbers and in gaseous environments. Gaseous environments I have used include air, glycol vapors, acid vapors, and inert gases.

Another important type of conditioning involves the removal of at least some of the substance in the interconnected pore structure of the body. This fluid is removed either in liquid form by absorption or by vaporization.

In both cases, if the liquid removal is improperly carried out, stresses in the body will increase due to surface tension forces, causing cracking (or flow in the event the body is still somewhat plastic). Such forces can also cause shrinkage, and they may be very large in fine pored bodies.

Also the stresses may not be uniform through large cross-sections as when fluid is lost from the body's surface faster than it can flow through the pores to the surface.

In my investigations to date, I have avoided the foregoing problems by submerging and heating the body in a bath of the pore forming or other liquid for periods which depend on its pore size and cross-section, but lie within the range previously cited.

In this way several objectives can be accomplished. First, as long as the body is completely filled with liquid, there will be no surface tension forces. Therefore, it is possible to develop additional strength in the body by allowing polymerization to proceed before any surface tension stresses are developed by liquid loss.

Upon subsequent drying a stage will be reached where vapor exists within the porous body. However, at this time, the body will have improved strength; and the imposed stress, which is proportional to the surface tension, will be reduced.

Also, if carried out under pressure, this step can be used to influence the final stages of polymerization without producing stresses that would tend to close the pores in the body.

Reduced pressure can be employed to vaporize the liquid in the pores. In bodies consolidated by freezing, it is possible to sublime the ice from the pores by freeze drying. Or these bodies can be warmed to melt the ice without losing cohesiveness and the liquid absorbed from the bed, as by paper towels.

It is also possible to employ a liquid bath treatment to substitute a selected fluid for the material in the interconnected pores. First the treating liquid can have a lower surface tension than the fluid in the pores of the body. It may also have a much higher than originally manageable acid content. In both cases liquid treatment allows a change in the pore fluid composition by diffusion and fluid flow.

Another important type of conditioning made possible by the interconnected pore structure of my bodies involves gaseous treatment with gases such as air, oxygen, and chlorine after the liquid has been removed from the consolidated body. In this way the binder in a massive piece can be treated in a short time to effect crosslinking or increased carbon yield.

In yet another type of conditioning I treat bodies employing constituents such as furfural alcohol resin and diethylene glycol in warm water (40° to 100°C) for periods of 1 to 24 hours, causing a large but controllable shrinkage to take place. In this case the density of the pyrolyzed piece is much higher than that of an identical piece not given this treatment. Therefore, the just described technique of conditioning affords yet another means of controlling apparent density.

Still other conditioning operations that I employ are machining, crushing, and grinding. Prior to pyrolysis, the bodies machine easily with good surface finish; and I have produced various high tolerance pieces for biomedical transcutaneous seals by using a finishing step before pyrolysis. It is important in this respect that the linear shrinkage in subsequent pyrolysis is isotropic even though it may be relatively large and is reproducible so that precise tolerances can be held.

Crushing and grinding of my novel bodies create a unique particulate material which has pores of controlled size within each particle. In addition to utilizing this material as discussed previously, I have found that it gives bodies with excellent properties when reconsolidated by heat and pressure. For such reconsolidation I have employed pressures of 5,000 psi and temperatures of 125° to 180°C for periods of 10 to 30 minutes.

In the pyrolysis step of my process, the consolidated (and perhaps conditioned) body is treated under specified conditions of time, temperature, pressure, and environment to bring about a depolymerization of the solids in the body and thereby increase the percentage of carbon in the body. The exact composition of and structure of the solid body will continuously change in complicated ways as heating proceeds. An excellent review of the factors involved in pyrolysis is given by Fitzer, et al in Chemistry and Physics of Carbon, 7, page 237 et seq., Marcel Dekker, Inc., N.Y., 1971.

I have pyrolyzed my consolidated bodies by generally well-known techniques employing maximum temperatures of 250°C to 2,400°C and pressures of 0.1 mm Hg to 10 psi.

Heating is at controlled rates ranging between 6°–43°C per hour in the range of up to 1,000°C. I have carried out pyrolysis in a vacuum and in flowing argon, but prefer flowing nitrogen. Since the properties of the cohesive pyrolyzed body are primarily determined by the highest temperature reached, no holding time is employed.

Generally, the pyrolysis is first carried out to about 700°C. At this temperature the interconnected pore structure built into the body by the pore forming liquid will have been developed, and the binder in the body will have lost most of its constituents besides carbon.

The carbonaceous solids comprising the continuous framework of the body will have a pore structure believed to include slit like openings about 5°A across. And, because of the interconnected pore system in the body, there is access to the openings. As a consequence, the material produced from fluid mixtures employing binders such as furfural alcohol resins when pyrolysis is stopped at 700°C (See example 47) are excellent molecular sieves.

Also, I have produced by pyrolyzing to ca. 700°C temperatures cohesive artifacts with a specific surface area of 510 m²/gm, which is in a range useful in the fields of absorption and catalysis.

I often in a second step heat the body above 700°C although two-step pyrolysis is in no way a requirement of my process; and the bodies may be heated to temperatures higher than 700°C in a single step. Heating to higher temperatures tends to graphitize the remaining carbon. The temperature employed will accordingly depend at least in part on the extent to which graphitization is wanted.

The degree of graphitization can also be increased by employing in the initial fluid mixture a filler which will catalyze the graphitization reaction. Such fillers include $TiO_2$, $Cr_2O_3$, $NiO$, $ZrO_2$, $WO_3$, $SiO_2$, $Fe_2O_3$, $V_2O_5$, $MoO_3$, etc.

Because of their unique structure my novel bodies have important advantages as far as pyrolysis is concerned. In bodies prepared by many "prior art" processes, a substantial amount of low molecular weight hydrocarbon gases must escape from the body. This causes severe structural disruption and shrinkage, and the gas usually cracks the body into small pieces.[9] For that reason massive carbonaceous bodies have heretofore been produced by bonding together pre-pyrolyzed particles with a pyrolyzable binder or by cumbersome lamination techniques (see U.S. Pat. No. 3,626,042) to Appleby.

The most advanced techniques heretofore available (see U.S. Pat. No. 3,109,712 to Redfern) require that one of a very few resins such as phenolformaldehyde be used, require very long pyrolyzing cycles of 30 days or more, and even then are not capable of producing bodies more than ¼ inch thick without cracking.

The continuous pore system in my consolidated body allows gases to readily escape during pyrolysis. I have been able to pyrolyze bodies with cross sections up to 6 inches and 10 micron pores in a heating time of about 2 days to above 2,000°C without any cracking. I have also pyrolyzed bodies of approximately 1 inch section having a pore size of less than 0.01 microns in times of about 4 days up to 2,000°C. Even larger sections with smaller pore sizes can be processed.

The pyrolyzed bodies I make are an excellent source of fillers of controlled characteristics for use in my process as described previously when reduced to particulate form. These materials also give excellent results when used as fillers in metal-carbon composites for seal and bearing applications.

It is often desirable to activate carbon by heating it in a controlled atmosphere (usually carbon dioxide) for catalytic applications. My bodies are particularly suited to this activation since the activating gas can easily penetrate to the interior of thick sections.

In the pyrolysis step many of the fillers which I may add to the initial fluid mixture are reduced to metals or converted to carbides, producing bodies having properties that make them particularly well-suited as catalysts and for a variety of other purposes. Again, bodies made by my process have the special advantage that the reduction and/or other reaction will proceed uniformly and to a much more controllable extent that is otherwise possible because of the controlled, interconnected, pore structure.

Post-treatment of the pyrolyzed bodies can also be employed to particular advantage in my process to impart special properties to, improve the quality of, or alter the characteristics of the body because of their novel, interconnected pore structure and their high physical strength and other mechanical properties. The possibilities for post-treatment are, as a consequence, almost limitless; and only a few representative post-treatments will therefore be mentioned here.

One important type of post-treatment is machining.

While my process is capable of producing objects to close tolerance by casting it is often desirable to machine the bodies after pyrolysis, which is easily done. I have produced bodies with tensile strengths in excess of 10,000 psi and compressive strengths above 40,000 psi that have a density of only 0.85 gm/cm³ and are still quite machinable. Even though the bodies are often of carbon so hard that it will scratch glass, the fine pore structure allows them to readily be worked with usual methods.

I can produce bodies that are easily polished to a mirror finish as it is easy to produce pores much smaller than can be seen with any instrument other than a high resolution electron microscope. This has allowed me to machine bearings that performed satisfactorily in a high temperature corrosive gas environment where no other material has proven satisfactory.

My novel bodies can be machined to intricate shapes with conventional dental tools. This coupled with the biocompatibility of high purity, hard carbons has allowed satisfactory alveolar ridge augmentation implants to be successfully produced from the material of Example 34 and transcutaneous devices to be made from a material similar to that of Example 31. In the first-mentioned application very large pores are desired for tissue intrusion, while in the second a highly polished very fine pored material is desired.

That my process permits the pore volume and pore size to be varied allows me to vary the elastic modulus of the final product; and I have produced materials with modulii ranging from about $1-5 \times 10^6$ psi. This, coupled with the shapability and biocompatibility of my artifacts, is of extreme value for dental implants since an implant can be produced with a matching or lower modulus than the supporting bone, thereby avoiding unwanted stress concentrations.

Another particularly important type of post treatment of the pyrolyzed body is reinfiltration. The novel bodies I produce are uniquely well-suited for reinfiltration because the pores in them are formed by removing in fluid form the substance or substances in a continuous, pore forming phase. Thus, reinfiltration involves only the reversal of the fluid removal step to replace the eliminated fluid with a different material or combination of materials.

The importance of the foregoing becomes evident upon a consideration of the materials that can be produced by reinfiltration, alone or with further processing. For example, for specific applications, I have already filled my novel bodies with a variety of materials which is so diverse as to include hydrocarbon and silicon oils, glasses, metal resins, and aqueous solutions of different character. It will be readily apparent to those skilled in the relevant arts that still other infiltrants may be employed with equal ease.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of producing a porous carbonaceous body, comprising the steps of:
   a. forming a free-flowing, castable, fluid mixture having a continuous liquid phase, said mixture being formed by blending together:
      i. a uniformly dispersable, organic, carbon yielding binder which is decomposable at a temperature in the range of 250°–2,400°C. to a solid carbonaceous residue constituting in excess of 0.2 percent by weight of the original binder;
  ii. a liquid pore former for forming a macroscopically uniform, continuous liquid phase throughout the castable fluid mixture, said pore former having a viscosity below 1,000 centipoises, a low vapor pressure, and a high flash point; and
  iii. a dispersing agent coactable with said binder and said pore former to keep said binder uniformly distributed throughout said castable mixture and to keep the liquid phase continuous;

said carbon yielding binder constituting from 5 to 95 percent by volume of said mixture, the pore former and dispersing agent together constituting from 5 to 91 percent by volume of the mixture, and the blending of the binder, pore former, and dispersing agent being continued until the mixture becomes free-flowing and the carbon yielding binder is uniformly distributed throughout the mixture;

b. casting the mixture to shape to thereby impart a selected shape to said mixture;

c. consolidating the cast mixture to a self-supporting consolidated body of organic material having uniformly distributed there-throughout a continuous phase of a liquid substance which can be eliminated from said body to form a system of uniformly distributed, primarily interconnected pores throughout the body, said consolidation step being carried out at a temperature below the vaporization points of all of the constituents of the mixture to retain the constituents of the mixture within the cast shape;

d. removing the substance constituting the continuous liquid phase from the self-supporting body to form the system of interconnected pores there-throughout, said step being carried out without increasing the volume of the self-supporting body; and e. heating the self-supporting body to a temperature sufficiently high to convert said body to a cohesive article of carbonaceous character having throughout a system of uniformly distributed, interconnected pores.

2. The method of claim 1, wherein the blending is effected by dissolving the organic binder in the liquid pore former or dispersing agent or both.

3. The method of claim 1, wherein the blending is effected by mechanically suspending the organic binder in the liquid pore former or dispersing agent or both.

4. The method of claim 1, together with the step of incorporating in said fluid mixture an auxiliary dispersing agent to thereby increase the uniformity with which the constituents of the fluid mixture are distributed therein.

5. The method of claim 1, wherein the fluid mixture is one which can be consolidated by polymerization and including the step of incorporating in said fluid mixture a consolidating agent capable of catalyzing the polymerization reactions.

6. The method of claim 1, wherein the liquid pore former and the dispersing agent are of a single liquid acting in a dual capacity.

7. The method of producing a porous carbonaceous body, comprising the steps of:

a. forming a free-flowing castable mixture having a continuous liquid phase, said mixture being formed by blending together:
  i. a uniformly dispersable, organic, carbon yielding binder which is decomposable at a temperature in the range of 250°–2,400°C. to a solid carbonaceous residue constituting in excess of 0.2 percent by weight of the original binder;
  ii. a pore former for forming a macroscopically uniform, continuous liquid phase throughout the castable fluid mixture, said pore former having a viscosity below 1,000 centipoises, a low vapor pressure, and a high flash point; and
  iii. a dispersing agent coactable with said binder and said pore former to keep said binder uniformly distributed throughout said castable mixture and to keep the liquid phase continuous;

said carbon yielding binder constituting from 5 to 95 percent by volume of said mixture, the pore former and dispersing agent together constituting from 5 to 91 percent by volume of the mixture, and the blending of the binder, pore former, and dispersing agent being continued until the mixture becomes free-flowing and the carbon yielding binder is uniformly distributed throughout the mixture;

b. incorporating in said free-flowing mixture at least one filler capable of altering the characteristics of the carbonaceous body;

c. casting the mixture to shape to thereby impart a selected shape to said mixture;

d. consolidating the cast mixture to a self-supporting body or organic material having uniformly distributed therethroughout a continuous phase of a liquid substance which can be eliminated from said body to form a system of uniformly distributed, primarily interconnected pores throughout the body, said consolidation step being carried out at a temperature below the vaporization points of all of the constituents of the mixture to retain the constituents of the mixture within the cast shape;

e. removing the substance constituting the continuous liquid phase from the self-supporting body to form the system of interconnected pores there-throughout, said step being carried out without increasing the volume of the self-supporting body; and f. heating the self-supporting body to a temperature sufficiently high to convert said body to a cohesive article of carbonaceous character having throughout a system of uniformly distributed, interconnected pores.

8. The method of claim 7, wherein the filler is soluble in the liquid pore former, the dispersing agent, or the binder.

9. The method of claim 7, wherein the filler is a particulate solid.

10. The method of claim 9, wherein the filler is a carbonaceous material.

11. The method of claim 9, wherein the filler is a particulate solid material and including the step or prewetting said filler before it is incorporated into the fluid mixture.

12. The method of claim 1, together with the step of uniformly incorporating in said fluid mixture one or more additional compounds capable of undergoing a chemical reaction in the heating step.

13. The method of claim 1, together with the step of removing from the fluid mixture before it is cast any bubbles which may be entrapped therein so that said mixture can be cast into a void-free body.

14. The method of claim 1, wherein said consolidating agent is first mixed with said liquid pore former and said dispersing agnet and said binder is then added to the mixture thus formed.

15. The method of claim 1, together with the step of milling the fluid mixture before it is cast to form a more uniform dispersion of the constituents of said mixture and to reduce in size any solid fillers which may be incorporated in the mixture.

16. The method of claim 1, wherein the cast mixture is consolidatable by polymerization and including the step of holding the mixture before it is cast at a selected temperature for a specified period of time to thereby effect partial polymerization and eliminate heat of polymerization from said fluid mixture before it is cast and/or to alter the character of the polymerization mechanism and/or the carbonaceous body.

17. The method of claim 1, together with the step of conditioning the fluid mixture before it is cast by holding it for specified period of time at a sub-ambient temperature.

18. The method of claim 1, wherein the cast mixture is consolidated by reducing the temperature of said mixture to a level where the liquid pore former present in the mixture will undergo a phase change to a solid.

19. The method of claim 1, wherein the cast mixture is consolidated by a polymerization mechanism.

20. The method of claim 19, wherein the cast mixture is subjected to ionizing radiation to effect polymerization.

21. The method of claim 19, wherein the cast mixture is heated to increase the rate of polymerization.

22. The method of claim 1, together with the step of holding the consolidated body at a specified temperature and under a specified pressure in a specific atmosphere for a specified length of time before subjecting it to said heating step.

23. The method of claim 1, wherein there is at least one polymerizable substance in the consolidated body and including the step of submerging the consolidated body in a bath of liquid before subjecting it to pyrolysis to increase the strength of the consolidated body.

24. The method of claim 1, wherein the cast mixture is consolidatable by polymerization and including the step of submerging the consolidated body in a bath of material which is a strong catalyst for the polymerization reactions to thereby cause said reaction to proceed further before said body is subjected to said heating setp.

25. The method of claim 1, together with the step of treating the self-supporting body produced in the consolidation step with a gaseous substance before it is subjected to said heating step to thereby alter the characteristics of the carbonaceous body.

26. The method of claim 1, together with the step of submerging the self-supporting body produced in the consolidation step in a heated liquid before it is subjected to said heating step to thereby cause said body to shrink and increase in density.

27. The method of claim 1, together with the step of reducing the body formed in the consolidation step to particulate form.

28. The method of claim 1, together with the step of reducing the article formed in said heating step to particulate matter.

29. The method of claim 1, together with the step of forming the porous carbonaceous body to shape after the heating step.

30. The method of claim 1, together with the step of infiltering one or more substances into the carbonaceous body after the heating step to thereby impart additional properties and/or capabilities to said article.

31. The method of claim 1, together with the step of heating the carbonaceous body after the aforesaid heating step in a carbon dioxide environment to thereby activate the carbon in said body.

32. The method of claim 1, wherein a combination of at least two dispersing agents is incorporated in said fluid mixture to afford additional control over the size of the pores in the porous carbonaceous body.

33. The method of claim 1, together with the step of forming the self-supporting body to shape between the consolidation and heating steps.

34. The method of producing a porous carbonaceous body, comprising the steps of:
a. forming a free-flowing, castable, fluid mixture having a continuous liquid phase, a viscosity of not more than 100 poises, and the constituents thereof in a selected, spatially uniform distribution, said mixture being formed by blending together;
   i. a uniformly dispersable, organic, carbon yielding binder which is decomposable at a temperature in the range of 250°–2,400°C. to a solid carbonaceous residue constituting in excess of 0.2 percent by weight of the original binder;
   ii. a liquid pore former for forming a macroscopically uniform, continuous liquid phase throughout the castable fluid mixture, said pore former having a viscosity below 1,000 centiposes, a low vapor pressure, and a high flash point; and
   iii. a dispersing agent coactable with said binder and said pore former to keep said binder uniformly distributed throughout said castable mixture and to keep the liquid phase continuous;
said carbon yielding binder constituting from 5 to 95 percent by volume of said mixture, the pore former and dispersing agent together constituting from 5 to 91 percent by volume of the mixture, and the blending of the binder, pore former, and dispersing agent being continued until the mixture becomes free-flowing and the carbon yielding binder is uniformly distributed throughout the mixture;
b. casting the mixture to shape to thereby impart a selected shape to said mixture;
c. consolidating the cast mixture to a self-supporting body of organic material having uniformly distributed therethroughout a continuous phase of a liquid substance which can be eliminated from said body to form a system of uniformly distributed, primarily interconnected pores throughout the body, said consolidation step being carried out at a temperature below the vaporization points of all of the consituents of the mixture to retain the constituents of the mixture within the cast shape;
d. removing the substance constituting the continuous liquid phase from the self-supporting body to form the system of interconnected pores therethroughout, said step being carried out by evaporating or absorbing the liquid phase from the said body and without increasing the volume of the self-supporting body; and e. heating the self-supporting body to a temperature of at least 250°C. to pyrolyze said body to a cohesive article of carbonaceous character having throughout a system of uniformly distributed, interconnected pores.

35. The method of claim 34, wherein the binder consists at least in part of a furfural or a furfural alcohol.

36. The method of claim 34, wherein the pore former is a glycol.

37. The method of claim 34, wherein the dispersing agent is a water-soluble isooctyl phenoxy polyethoxy ethanol.

38. The method of claim 34, wherein the liquid pore former and dispersing agent are both of the same material, which is a glycol having at least one radical with more than two carbon atoms.

39. The method of claim 34, together with the step of adding up to 60 percent by volume of a filler to the fluid mixture.

40. The method of claim 39, wherein the filler is monodispersed, spherical, carbonaceous particles.

41. The method of claim 39, wherein the filler is monodispersed, porous, carbonaceous particles.

42. The method of claim 34, wherein the binder consists at least in part of a polymerizable furfural or furfural alcohol and including the step of including in the fluid mixture from 5 to 60 percent by volume of an acid to catalyze the polymerization of the furfural or furfural alcohol.

43. The method of claim 42, wherein the catalyst is paratoluene sulfonic acid.

44. The method of claim 34, wherein, in said consolidation step, the cast mixture is maintained at a temperature of not more than about 100°C.

45. The method of claim 34, wherein the binder consists at least in part of a furfural and/or furfural alcohol which can be polymerized and wherein consolidation is effected by heating the cast mixture to a temperature of at least 150°C for a period of at least several hours to effect said polymerization.

46. The method of claim 34, together with the step of conditioning the fluid mixture before it is cast by holding said mixture at a temperature of from −15° to 150°C for at least several minutes.

47. The method of claim 34, together with the step of adding an auxilliary dispersing agent to the fluid mixture before it is cast to control the change in volume of the cast mixture during the consolidation step.

48. The method of claim 34, together with the step of conditioning the consolidated body before subjecting it to pyrolysis by holding it at a temperature of from 10° to 180°C under a pressure 0.1mm Hg to 10 psi in a liquid or gaseous environment for a period of one to several hundred hours.

49. The method of claim 34, wherein the consolidated body is pyrolyzed by subjecting it to a temperature of at least 250°C under a pressure of 0.1mm of Hg to above atmospheric in a non-oxidizing environment.

50. The method of claim 34, wherein the increase in the temperature of the body in said heating step is limited to 6°–43°C per hour.

51. The method of claim 34, wherein the temperature to which the body is heated is limited to 700°C.

52. The method of claim 34, wherein the body is heated in a first step to a temperature on the order of 700°C and in a second step to a maximum of 2,100°C or higher.

53. The method of claim 34, together with the step of including in the fluid mixture a material which will catalyze the graphitization reactions which occur when the consolidated body is subjected to pyrolysis.

54. A porous, cohesive, carbonaceous body, made by the process of claim 1.

55. A porous, cohesive, carbonaceous body made by the process of claim 34.

56. The method of producing a porous carbonaceous body, comprising the steps of:
   a. forming a free-flowing castable mixture having a continuous liquid phase, said mixture being formed by blending together:
      i. a uniformly dispersable, organic, carbon yielding binder which is decomposable at a temperature in the range of 250°–2,400°C. to a solid carbonaceous residue constituting in excess of 0.2 percent by weight of the original binder;
      ii. a pore former for forming a macroscopically uniform, continuous liquid phase throughout the castable fluid mixture, said pore former having a viscosity below 1,000 centiposes, a low vapor pressure, and a high flash point; and
      iii. a dispersing agent coactable with said binder and said pore former to keep said binder uniformly distributed throughout said castable mixture and to keep the liquid phase continuous;
   said carbon yielding binder constituting from 5 to 95 percent by volume of said mixture, the pore former and dispersing agent together constituting from 5 to 91 percent by volume of the mixture, and the blending of the binder, pore former, and dispersing agent being continued until the mixture becomes free-flowing and the carbon yielding binder is uniformly distributed throughout the mixture;
   b. casting the mixture to shape to thereby impart a selected shape to said mixture;
   c. consolidating the cast mixture to a self-supporting body of organic material having uniformly distributed therethroughout a continuous phase of a liquid substance which can be eliminated from said body to form a system of uniformly distributed, primarily interconnected pores throughout the body, said consolidation step being carried out at a temperature below the vaporization points of all of the constituents of the mixture to retain the constituents of the mixture within the cast shape;
   d. removing the substance constituting the continuous liquid phase from the self-supporting body to form the system of interconnected pores threrthroughout, said step being carried out without increasing the volume of the self-supporting body;
   e. heating the self-supporting body to a temperature sufficiently high to convert said body to a cohesive article of carbonaceous character having throughout a system of uniformly distributed, interconnected pores;
   f. reducing said body to a particulate porous material;
   g. blending together a fluid mixture as defined in step (a) and the particulate material obtained as specified in paragraph (f);
   h. casting the mixture thus obtained to thereby impart a selected shape to said mixture;
   i. consolidating the mixture while retaining the constituents of the mixture therein to thereby produce a self-supporting body of organic material having uniformly distributed therethrough said porous particulate material and a substance which can be eliminated from said body to form a system of uniformly distributed pores of selected size therein;

j. eliminating said uniformly distributed substance from said self-supporting body to form said interconnected pore system therein; and k. subjecting the self-supporting body to pyrolysis to thereby convert it to a cohesive article of carbonaceous character having therein at least two independently regulated and connected systems of interconnected pores.

57. The method of claim 56, wherein the self-supporting body of paragraph (c) is subjected to pyrolysis before it is converted to particulate form.

58. The method of producing a porous carbonaceous body, comprising the steps of:
  a. forming a free-flowing castable mixture having a continuous liquid phase, said mixture being formed by blending together:
    i. a uniformly dispersable, organic, carbon yielding binder which is decomposable at a temperature in the range of 250°–2,400°C. to a solid carbonaceous residue constituting in excess of 0.2 percent by weight of the original binder;
    ii. a pore former for forming a macroscopically uniform, continuous liquid phase throughout the castable fluid mixture, said pore former having a viscosity below 1000 centiposes, a low vapor pressure, and a high flash point; and
    iii. a dispersing agent coactable with said binder and said pore former to keep said binder uniformly distributed throughout said castable mixture and to keep the liquid phase continuous;
  said carbon yielding binder constituting from 5 to 95 percent by volume of said mixture, the pore former and dispersing agent together constituting from 5 to 91 percent by volume of the mixture, and the blending of the binder, pore former, and dispersing agent being continued until the mixture becomes free-flowing and the carbon yielding binder is uniformly distributed throughout the mixture;
  b. casting the mixture to shape to thereby impart a selected shape to said mixture;
  c. consolidating the cast mixture to a self-supporting body of organic material having uniformly distributed therethroughout a continuous phase of a liquid substance which can be eliminated from said body to form a system of uniformly distributed, primarily interconnected pores throughout the body, said consolidation step being carried out at a temperature below the vaporization points of all of the constituents of the mixture to retain the constituents of the mixture within the cast shape;
  d. removing the substance constituting the continuous liquid phase from the self-supporting body to form the system of interconnected pores therethroughout, said step being carried out without increasing the volume of the self-supporting body;
  e. heating the self-supporting body to a temperature sufficiently high to convert said body to a cohesive article having throughout a system of uniformly distributed, interconnected pores;
  f. reducing said body to a particulate material; and
  g. reconsolidating said material by the application of pressure or heat and pressure to form a structurally integral body which can be converted by the application of heat to one of carbonaceous character.

59. The method of claim 58, together with the step of subjecting the body formed by said reconsolidation to pyrolysis to thereby convert it to a cohesive article of carbonaceous character.

60. The method of claim 59, wherein said particulate material is reconsolidated by subjecting it to a pressure of at least several thousand psi at a temperature of at least 125°C.

61. The method of claim 7, wherein the filler is silicon or a silicon oxide.

62. The method of claim 7, wherein the filler is a metallic compound.

63. The method of claim 62, wherein the filler is an organometallic compound.

64. The method of claim 62, wherein the filler is a metallic oxide.

65. The method of claim 7, wherein the filler is a silicate.

66. The method of claim 7, wherein the filler is a colloidal silica.

67. The method of claim 7, wherein the filler is in the metallic state.

* * * * *

PO-1050
(5/69)

UNITED STATES PATENT OFFICE
CERTIFICATE OF CORRECTION

Patent No. 3,859,421           Dated   January 7, 1975

Inventor(s)  Edward E. Hucke

It is certified that error appears in the above-identified patent and that said Letters Patent are hereby corrected as shown below:

Column 2, line 34, change "high" to --highly--.

Column 2, line 60, change "may" to --my--.

Column 6, line 62, change "may" to --my--.

Column 6, line 64, change "free-floiwng" to --free-flowing--.

Column 7, line 8, change "of" to --or--.

Column 7, line 36, change "of" to --Of--.

Column 7, line 38, change "10.000" to --10,000--.

Column 7, line 55, change "where" to --were--.

Column 8, line 58, change "tubular" to --tabular--.

Table II, Example 45, Pore Former column, change "19-50m" to --12-50m--.

Table II, Example 47, Pyrolysis column, change "N700°" to --700°--.

Column 14, line 39, change "millng" to --milling--.

Column 14, line 43, insert --23-- before the "dash".

Column 15, line 36, change "processed" to --possessed--.

Column 16, line 12, change "along" to --alone--.

UNITED STATES PATENT OFFICE
CERTIFICATE OF CORRECTION

Patent No. 3,859,421　　　　　　　　　　Dated January 7, 1975

Inventor(s) Edward E. Hucke

It is certified that error appears in the above-identified patent and that said Letters Patent are hereby corrected as shown below:

Column 17, line 50, after invention, change the "semi-colon(;)" to a --colon(:)--.

Column 19, line 25, change "results" to --resulted--.

Column 19, line 30, change "In" to --I--.

Column 19, line 47, change "if" to --is--.

Column 20, line 53, change "wise" to --wide--.

Column 21, line 17, change "dissolve" to --dissolved--.

Column 21, line 24, change "(Example 3b)" to --(Example 36)--.

Column 21, line 62, after "type" delete the --comma--.

Column 23, line 62, change "and" to --are--.

Column 24, line 26, change "its" to --it--.

Column 25, line 27, change "ane" to --and--.

Column 29, line 18, number the footnote --9--.

Column 29, line 48, change "that" to --than--.

Column 32, line 57, change "or" to --of--.

Column 33, line 3, change "agnet" to --agent--.

Column 33, line 41, change "pyrolysis" to --said heating step-- per Amendment C filed May 10, 1974.

UNITED STATES PATENT OFFICE
CERTIFICATE OF CORRECTION

Patent No. 3,859,421      Dated January 7, 1975

Inventor(s) Edward E. Hucke

It is certified that error appears in the above-identified patent and that said Letters Patent are hereby corrected as shown below:

Column 33, line 49, change "setp" to --step--.

Column 36, line 50, change "threrthroughout" to --therethroughout--.

Under the heading "References Cited" add --3,634,569 1/1972 Emanuelson et al 264/29-- per Paper No. 3.

Signed and sealed this 3rd day of June 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

PATENT NO. : 3,859,421
DATED : January 7, 1975
INVENTOR(S) : Edward E. Hucke

It is certified that error appears in the above-identified patent and that said Letters Patent are hereby corrected as shown below:

Column 30, line 45, change "metal" to --metals,--.

Signed and Sealed this twenty-ninth Day of June 1976

[SEAL]

Attest:

RUTH C. MASON
Attesting Officer

C. MARSHALL DANN
Commissioner of Patents and Trademarks